Patented Oct. 21, 1930

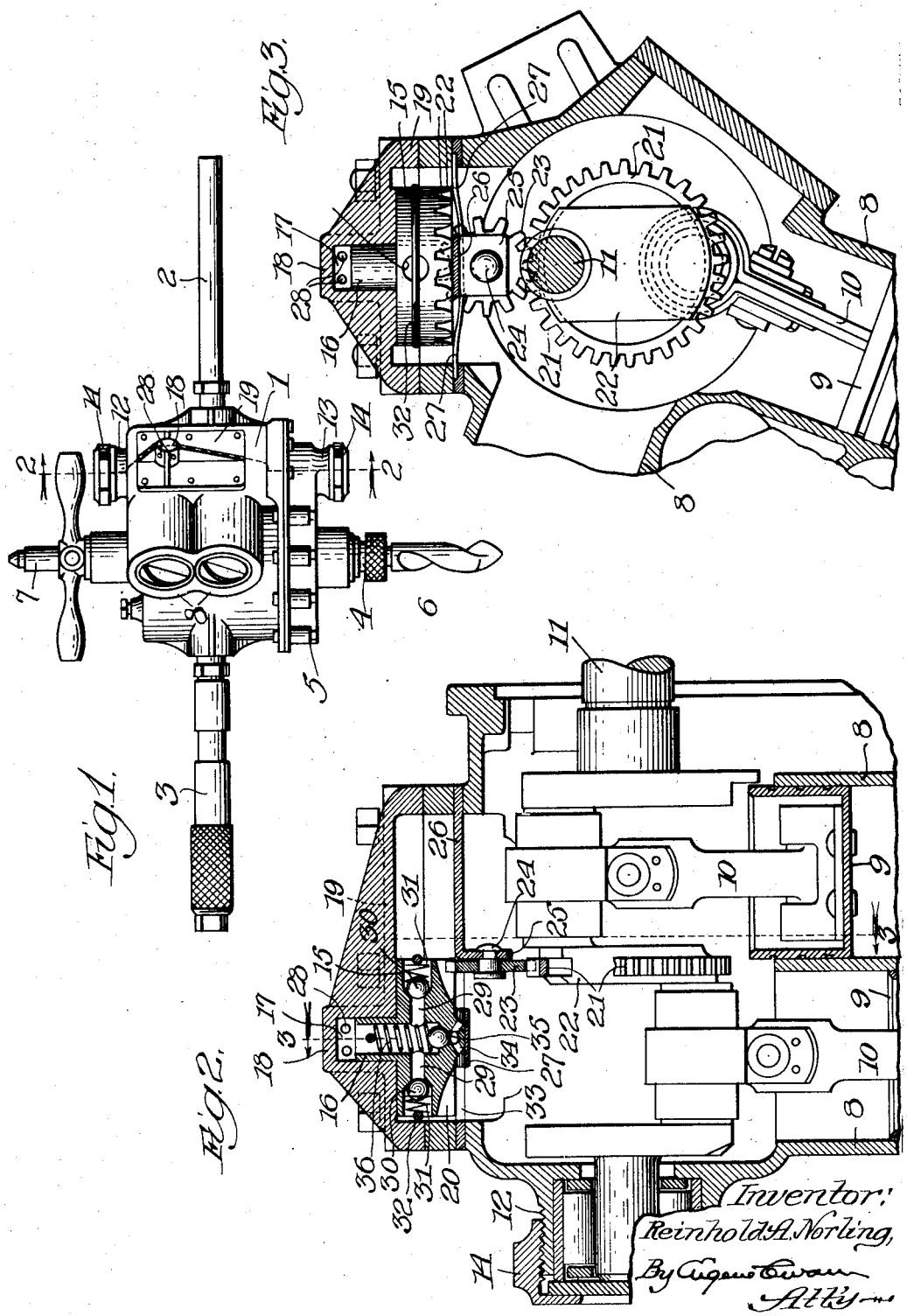

1,779,246

UNITED STATES PATENT OFFICE

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE

VENTING MEANS FOR PNEUMATIC DRILLS

Application filed April 25, 1927. Serial No. 186,268.

This invention relates to crank case venting for rotary pneumatic tools, such as drills.

In tools of this type, the crank and gear cases are united, and the moving parts of the motor, such as the crank shaft and the connecting rod bearings, as well as the gears, are lubricated by the splash system, the lubricant being usually a slow flowing oil or grease. These tools in operation are placed and held in various positions, up, down, horizontal, and at angles, depending on the lay of the work. It therefore follows that the lubricant from gravity accumulates in various places in the drill case, according to the positions of the tools. The cylinder and valve bores open into the gear and crank cases, respectively, and the compressed air used in operating the tools leaks into both cases. Unless prevented, there would be an undesirable accumulation of air pressure in the crank case. Should a plain hole be made in the crank case for venting purposes, there would be always some position of the tool where the lubricant would cover the hole and be forced out of the case as the pressure therein increased. Even in other positions, the lubricant would be forced out of the case with the escaping air, as the lubricant is churned and becomes aerated in the operation of the tool and thus is readily carried out with the escaping air.

Prior Patent No. 1,591,539, granted July 6, 1926, to myself and Axel Levedahl, discloses a venting means in which the air vent passage is formed in the crank shaft and opening to the atmosphere through an end of the shaft, preferably the upper end, that is, the end which is uppermost when the tool is held in a position with the drill bit extending downward. With the vent passage so provided, it must open through the thrust plate in the bearing extension with which the case of the tool is provided for the end journal. The shaft in its end play moves away from this plate and allows the lubricant which follows the escaping air to escape about the end journal and leak out of the case.

Said prior patent also discloses a centrifugally operated valve means for opening and closing the vent passage through the crank shaft. This valve means is mounted on and carried by one of the arms of the crank shaft and, as the diameter of this arm is limited, the amount of centrifugal force exerted on the valve means and on the lubricant during the rotation of the crank shaft is likewise limited.

In my copending application Serial No. 184,564, filed April 18, 1927, the vent is through the crank case and not through the crank shaft, and the rotary member by which centrifugal forces are set up to separate the lubricant from the escaping air is located farther out from the center of the crank shaft than the diameter of the crank arms, and thus may be rotated at a much faster speed than the crank shaft to increase the efficiency of the centrifugal action. Moreover, the valve means carried by said rotary member to open and close the vent passage therethrough is operated through the increase and decrease of the centrifugal forces set up in the rotation of said rotary member. Should the operation of the tool be slowed down to such an extent that the centrifugal force created by the rotary member is not sufficient to open said valve, as is likely to happen when the tool is under a heavy load, the air accumulating in the crank case can not escape until the speed of the tool is sufficient to open the valve. This is not a serious detriment, as the tool is not likely to be operated under these conditions except at infrequent intervals and the accumulated air soon has a chance to escape.

It is desirable, however, to relieve the accumulated air even under these conditions, and such is the object of my present invention.

One way to accomplish this object is to provide the rotary member at its center with a spring pressed valve which will not be affected by the centrifugal action referred to, but which will be opened by the pressure of the accumulated air when the other valve means which is subjected to centrifugal action remains closed when the speed of the tool is not sufficient to open such valves.

The invention consists further in the matters hereinafter described and claimed.

In the accompanying drawings—

Fig. 1 shows a portable piston actuated pneumatic drill provided with a venting means of my present invention;

Fig. 2 is an enlarged vertical sectional view taken on line 2—2 of Fig. 1 to show the venting structure; and Fig. 3 is a similar view taken on the indirect line 3—3 of Fig. 2.

The tool shown in Fig. 1 has a motor case 1 with a handle 2 on one side and a combined handle and throttle valve 3 on the opposite side, and through the latter of which compressed air or other motive fluid for operating the tool is supplied thereto, as in tools of this general type.

The spindle 4 of the tool extends out through the gear case 5, which is bolted to the case 1 and is made to carry a bit 6, as in tools of this design. At the opposite end of the tool there is a screw feed 7, as usual in these tools.

The case 1 is provided on each side with a pair of parallel cylinders 8, 8, only one pair being shown in the drawings. These cylinders are arranged V type and in them work single acting pistons 9, as shown in Fig. 2. The pistons are connected by connecting rods 10 to a crank shaft 11. The shaft 11 is offset to one side of the spindle 4 and has a gear connection therewith, the gears being in the gear case 5. The end journals of the shaft 11 are supported in roller bearings in extensions 12, 13 on the cases 1 and 5, respectively. These extensions are tightly closed by screw cap assemblies 14, 14, which prevent lubricant leaking out of the drill about said end journals.

Associated with the crank case 1 is a rotary member 15 having a tubular hub or bearing extension 16 fitting in a cylindric recess 17 in a boss 18 preferably cast integral with the cover plate 19 for the opening in said case. The member 15 is rotated from the crank shaft 11, preferably by a gear connection between the two. This connection, as shown in Fig. 2, comprises gear teeth 20 on the under side of the rotary member 15, and a ring gear 21 having a pressed fit on or otherwise secured to one of the arms 22 of the crank shaft, and a pinion 23 in mesh with the ring gear 21 and the teeth 20 on the rotary member 15, respectively. The ring gear 21 is fitted on the middle crank arm 22, and the pinion 23 is journaled on a stud 24 riveted or otherwise secured to a tongue 25 struck out of a support 26 beneath the cover 19.

The support 26 is in the form of a plate at the opening for which the cover 19 is provided. This plate is clamped in place by the same cap screws which hold the cover 19 in place. The plate 26 is open at the rotary member 15, and across this opening extends a cross-bar 27, on which the rotary member 15 bears to prevent it from dropping or working out of the recess 17. The latter is longer than the hollow bearing member 16 so as to provide a chamber at its inner end which is open to the atmosphere through a number of vent holes 28, 28 in the boss 18.

The member 15 has a number of radial passages 29, 29 which have their outer ends opening through the periphery of the member above the teeth 20. The inner ends of said passages open into the passage in the bearing hub 16. The outer ends of the passages 29 are enlarged to provide chambers for ball valves 30, which by coiled springs 31, 31 are normally held against seats at the inner ends of said chambers to close the passages 29, as shown in Fig. 2. A wire ring 32 extends about the member 15 at the outer ends of the passages 29 and in crossing the same holds the springs 31 in the passages and against the ball valves 30. The ring 32 is divided or split so that it may be readily applied to and be taken off of the member 15 in the assembly and repair of the valves and their springs, respectively.

The opening in the plate 26 is marked 33, and this extends about the rotary member 15 only, the rest of the plate covering the portion of the crank case 1 over which it extends. This directs the air in its escape from the crank case through the teeth 20 of the rotary member 15 before reaching the outer ends of the passages 29. Thus any lubricant carried by the escaping air will be brought into direct contact with the member 15, which in being rotated by the crank shaft 11 will set up centrifugal forces to throw off the lubricant and retain it in the crank case and prevent any lubricant being carried out of the crank case with the escaping air. These centrifugal forces will also at the same time unseat the ball valves 30 and open the crank case to the atmosphere through the passages 29 and ports 28. It is to be noted that the rotary member 15 is located well outside of the diameter of the crank arms of the crank shaft 11 and thus the effective diameter of the gearing may be such as to cause the member 15 to be turned at a much higher speed than that of the crank shaft. This will greatly increase the centrifugal action of the rotary member 15 and insure throwing lubricant off of the same, so that no opportunity is afforded for the lubricant to be carried out of the vent passages with the escaping air.

The rotary member 15 is located adjacent the upper end of the crank shaft 11, and thus the air in escaping from the case 1 will be be required to pass to the upper end of the case to reach the vent passages. This will supply lubricant to the upper end journal of the shaft and also the upper connecting rod and prevent such parts from running dry when the tool is drilling downward, as shown in Fig. 1.

With the ball valves 30 being seated by their springs 31, any pressure within the crank case would not unseat the valves should the tool be running too slow for centrifugal forces to unseat the valves, as is likely to happen when the tool is occasionally under a heavy load. At this time it is advisable to vent the crank case, and to accomplish the result I continue the passage in the hub 16 to the center of the rotary member 15 and there, by branches 34, 34, open it into the crank case on opposite sides of the web 27. At this point the main passage is restricted to provide a seat for a ball valve 35, which is normally held against said seat by a coiled spring 36. This spring is on the inside of the valve and thus the valve may be unseated by sufficient pressure in the case to overcome the tension of the spring. When the tool operates fast enough for centrifugal forces to unseat the valves 30, the pressure in the case is relieved through the passages 29 and the valve 35 is held closed by its spring so that no opportunity is afforded for the lubricant to leak out past said valve should the tool be held in a position with the bearing extension 12 extending downward, as when drilling upward. On the other hand, should the drill while held in this position develop a slow speed so that centrifugal action would not unseat the valves 30, the valve 35 would open under the proper pressure to relieve the same and close when the pressure was relieved. This intermittent opening and closing of the valve 35 would prevent the lubricant from draining out of the vent passages should the lubricant be at a level on line with or above the passage which is open and closed by said valve. Ordinarily the lubricant level would not be that high, although likely to be should the case be overfilled. Furthermore, the branch passages 34 are relatively small and would greatly retard the flow of the grease therethrough. Moreover, these passages are shielded by the cross-web 27, which would also retard the flow of the grease. Being at the center of the rotary member 15, the valve 35 would not be affected by centrifugal action.

The details of structure shown and described may be variously changed and modified without departing from the spirit and scope of my invention.

I claim as my invention:

1. In a fluid actuated rotary tool, the combination with a casing, of a crank shaft journaled therein, a rotary member in said casing and having a hollow bearing extension open at its outer end to the atmosphere and journaled in the casing at one side of said shaft, said member having radial passages within the casing and opening into said hollow extension to vent the casing to the atmosphere through said member of fluid tending to accumulate in the casing during the operation of the tool, and means whereby the crank shaft rotates said rotary member, and valve means carried by said rotary member for said radial passages and opened by the centrifual forces set up in the rotation of said rotary member.

2. In a fluid actuated rotary tool, the combination with a casing, of a crank shaft journaled therein, a rotary member carried by the casing and having central and radial passages opening to the atmosphere whereby fluid accumulating in the casing during the operation of the tool may escape from the casing to the atmosphere through said passages, means whereby the crank shaft rotates said rotary member, and spring seated valves carried by the rotary member for the central and radial passages, respectively, the valves for the radial passages being opened by centrifugal forces and the valve for the central passage being opened by pressure within the casing.

3. In a fluid actuated rotary tool, the combination with a casing, of a crank shaft journaled therein, a rotary member carried by the casing to one side of said shaft and having central and radial passages open to the atmosphere whereby fluid tending to accumulate in the casing during the operation of the tool may escape from the casing to the atmosphere through said passages, said radial passages having enlarged portions forming chambers, ball valves in said chambers and opened by the centrifugal forces set up in the rotation of said rotary member, springs in said chambers for seating the valves, and means whereby the crank shaft rotates said rotary member.

4. In a fluid actuated rotary tool, the combination with a casing, of a crank shaft journaled therein, a rotary member carried by the casing to one side of said shaft and having central and radial passages open to the atmosphere whereby fluid tending to accumulate in the casing during the operation of the tool may escape from the casing to the atmosphere through said passages, said radial passages having their outer ends enlarged to provide chambers, ball valves in said chambers and opened by the centrifugal forces set up in the rotation of said rotary member, springs in said chambers for seating said valves, a spring ring about said rotary member and extending across said chambers for holding the springs therein, and means whereby the crank shaft rotates said rotary member.

5. In a fluid actuated rotary tool, the combination with a casing, of a crank shaft journaled therein, said casing having a cylindric recess at one side of said shaft and communicating with the atmosphere, a rotary member having a hollow bearing extension and gear teeth on its opposite sides with the extension in said recess, said rotary member having radial passages opening into said hollow extension to vent the casing to the atmosphere, a ring gear on the crank shaft, and a pinion supported in the casing and in mesh with the ring gear and the gear teeth on the rotary member, respectively.

6. In a fluid actuated rotary tool, the combination with a casing, of a crank shaft journaled therein, a cover for the casing and having an outwardly extending boss at one side of said shaft with a cylindric recess in said boss open to the atmosphere, a rotary member having a hollow bearing extension journaled in said recess, said rotary member having radial passages opening into said hollow extension to vent the casing to the atmosphere through said boss, ball valves in said passages and opened by centrifugal forces set up in the rotation of said rotary member, and means whereby the crank shaft rotates said rotary member.

7. In a fluid actuated rotary tool, the combination with a casing, of a crank shaft journaled therein, a cover for the casing and having an outwardly extending boss with a cylindric recess therein open to the atmosphere, a rotary member having a hollow bearing extension and gear teeth on its opposite sides with the extension journaled in said recess, said rotary member having radial passages opening into said hollow extension to vent the casing to the atmosphere through said boss, a ring gear on said crank shaft, a plate clamped in the casing by said cover and having a tongue adjacent said ring gear, and a pinion carried by said tongue and in mesh with the ring gear and the gear teeth on said rotary member, respectively.

8. In a fluid actuated rotary tool, the combination with a casing, of a crank shaft journaled therein, a cover for the casing and having an outwardly extending boss with a cylindric recess therein open to the atmosphere, a rotary member having a hollow bearing extension and gear teeth on its opposite sides with the extension journaled in said recess, said rotary member having radial passages opening into said hollow extension to vent the casing to the atmosphere through said boss, a ring gear on said crank shaft, a plate clamped in the casing by said cover and having two supports, one under the rotary member to hold the same in said recess, and the other adjacent the ring gear, and a pinion carried by said last named support and in mesh with the ring gear and the teeth on the rotary member, respectively.

9. In a fluid actuated rotary tool, the combination with a casing, of a crank shaft journaled therein, a cover for the casing and having an outwardly extending boss with a recess therein open to the atmosphere, a rotary member having a hollow bearing extension in said recess, said rotary member having radial passages opening into said hollow extension to vent the casing to the atmosphere through said boss, a plate clamped to the casing beneath said cover and having an opening under said rotary member, a cross-web clamped between the cover and the plate and extending across the opening therein under said rotary member for holding the same in said recess, and means whereby the crank shaft rotates said rotary member.

10. In a fluid actuated rotary tool, the combination with a casing, of a crank shaft journaled therein, a cover for the casing and having a recess therein open to the atmosphere, a rotary member having a hollow bearing extension in said recess, said extension having its outer end opening into said recess and its inner end communicable with branch passages at the center of said member, said rotary member having radial passages opening into the passage through said extension, spring pressed ball valves carried by the rotary member for the radial and branch passages, respectively, a cross-web clamped to the casing by said cover and extending over the center of the rotary member between said branch passages for holding the rotary member in said recess, and a driving connection from the crank shaft to the rotary member.

In testimony whereof I affix my signature this 19th day of April, 1927.

REINHOLD A. NORLING.